United States Patent [19]

MacMillan

[11] 4,310,374
[45] Jan. 12, 1982

[54] TIRE RETREADING MACHINE

[75] Inventor: Kenneth T. MacMillan, Macon, Ga.

[73] Assignee: Donald MacMillan & Son, Inc., Macon, Ga.

[21] Appl. No.: 159,496

[22] Filed: Jun. 16, 1980

[51] Int. Cl.³ .......................................... B29H 17/36
[52] U.S. Cl. .............................. 156/394 FM; 34/106;
156/96; 156/381; 219/385; 219/400; 422/295;
422/302; 422/307; 425/18; 432/120; 432/122;
432/212
[58] Field of Search .......................... 156/96, 381, 394;
425/18, 17; 34/104, 106; 219/385, 400, 406,
438; 422/129, 292, 295, 302, 307; 432/120, 122,
212

[56] References Cited

U.S. PATENT DOCUMENTS

| | | | |
|---|---|---|---|
| 3,752,726 | 8/1973 | Barefoot | 156/394 FM |
| 3,820,525 | 6/1974 | Pond | 126/21 A |
| 3,884,739 | 5/1975 | Hindin et al. | 156/96 |
| 3,917,440 | 11/1975 | Huebert | 425/18 |
| 3,989,428 | 11/1976 | Cox | 425/18 |
| 4,028,168 | 6/1977 | Wolfe | 156/394 |
| 4,029,463 | 6/1977 | Johansson | 432/25 |
| 4,075,047 | 2/1978 | Brodie et al. | 156/96 |
| 4,096,908 | 6/1978 | Lamy | 165/64 |

Primary Examiner—John E. Kittle

Attorney, Agent, or Firm—Diller, Ramik & Wight

[57] ABSTRACT

This disclosure is directed to a tire retreading machine which includes a chamber adapted to receive therein a plurality of stacked tires adapted to be retreaded therein, the chamber having an inner surface, and inwardly therefrom there being a radiant heater, a porous or perforated shield, and an imperforate or nonporous shield with the latter being axially shorter than the former and both shields being spaced from a bottom surface of the chamber such that upon heat being generated by the radiant heater, hot air convection currents are set up within the chamber flowing generally upwardly adjacent the chamber inner surface and flowing generally downwardly between the imperforate shield and tires within the chamber to create substantially uniform curing or retreading temperature throughout the chamber, lessening temperature gradients or hot spots, and also allowing radiant heat to pass through a lower portion of the porous shield adjacent the bottom surface of the chamber to augment temperature uniformity throughout the chamber, the tire retreading machine also includes a novel mechanism for opening and closing an upper end of the chamber utilizing a cover which is moved linearly along a path defined by coincident axes of the cover and the chamber, and also along an arcuate path between an open position of the cover and an out-of-the-way position thereof.

24 Claims, 6 Drawing Figures

U.S. Patent    Jan. 12, 1982    Sheet 2 of 3    4,310,374
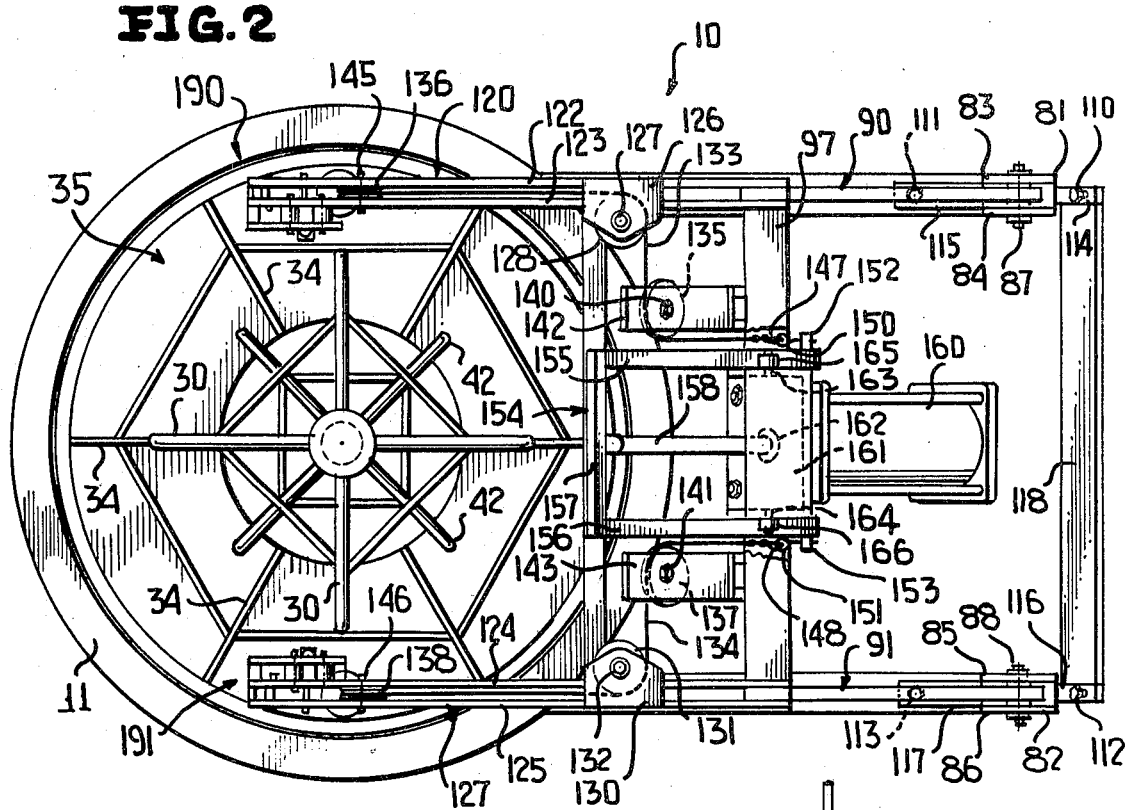
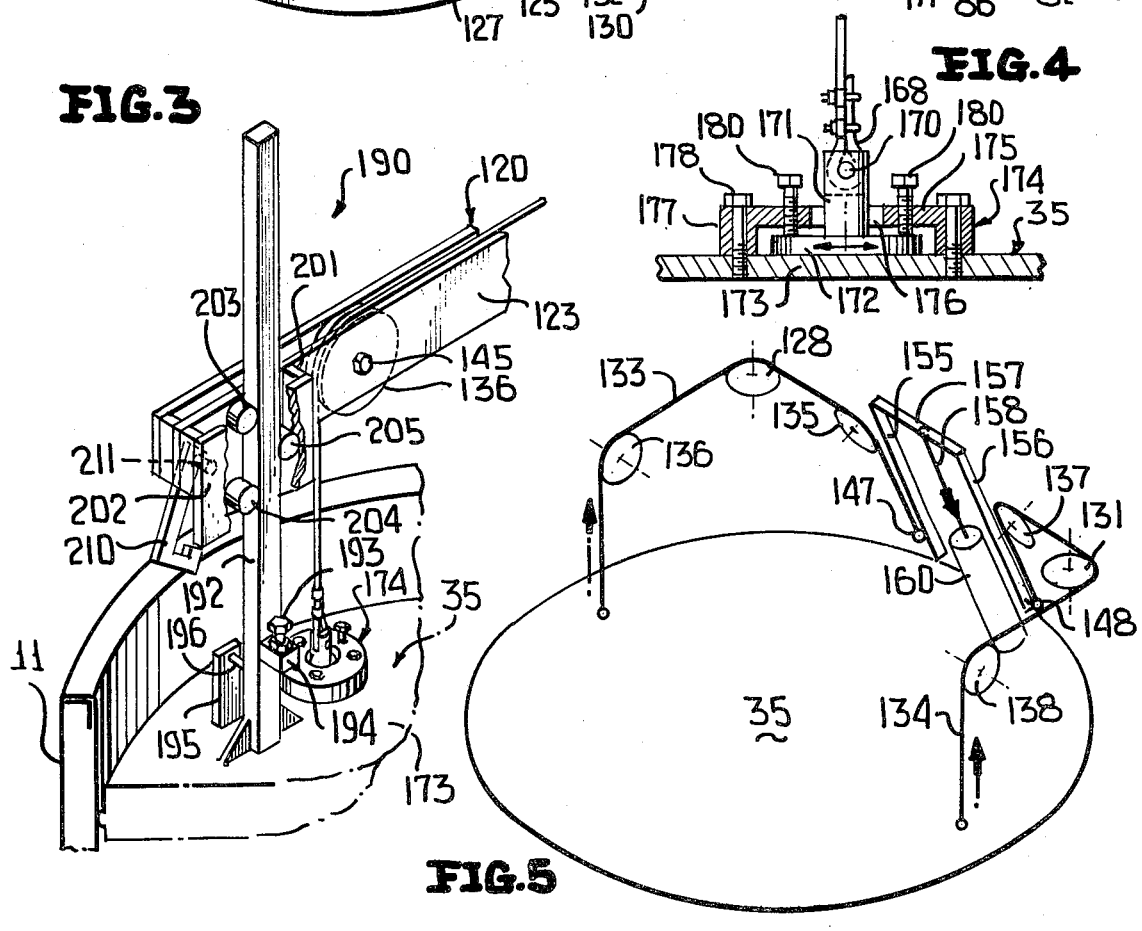

TIRE RETREADING MACHINE

It is relatively well known to adhesively bond precured tread to tire casings and thereafter place the tire casings with the precured threads thereon into a chamber which is heated in a conventional manner to set or cure the adhesive and, thus, bond the precured threads to the tire casings. In conventional heated chambers of this type, the tires with the precured threads thereon are generally stacked vertically or suspended horizontally, but in either case, they are heated exteriorly by a hot fluid medium (air or liquid) circulating between the inner surface of the chamber and the outer surface of the new treads or impervious flexible envelopes housing the treads and tire casing side walls. The difficulty in such conventional retreading chambers or precured molds is that the heating medium (liquid or air) was not evenly distributed and, therefore, a rather noticable temperature gradient was created resulting in improper curing of the adhesive due to low or high temperature, depending upon a variety of factors including the particular position of a tire within the conventional precured chamber and the relationship of the tire to the source of heat. These disadvantages are more acute when the tires which are to be retreaded with precured treads are foam-filled or solid tires, because for the latter it is necessary to achieve as uniform a heat distribution within the precured chamber as is possible.

In order to overcome disadvantages known in prior art precured chambers or precured molds, the present invention includes within a conventional generally annular chamber one or more radiant heating elements mounted in telescopic relationship between an inner surface of the chamber wall and two annular shields both of which are spaced from a bottom surface of the chamber. The shields are preferably defined by an outermost porous or perforated shield and an innermost nonporous or imperforate shield with the latter being shorter than the former, such that upper and lower perforated edge portions of the perforate shield project beyond upper and lower edges of the imperforate shield. Thus, as heat is generated by the radiant heaters (S) exteriorly of the perforate or porous shield, convection currents are established such that the flow is generally upwardly between the chamber inner surface and the perforate shield and then generally downwardly in the area between the imperforate shield and tires therewithin. This constant convection circulation establishes generally uniform temperature throughout the interior of the chamber, thus achieving uniform cure of the adhesive and, thus, excellent bond of the precured treads to the tire casings.

In further accordance with this invention, the lowermost tire is also directly heated by radiant heat from the heater means which passes directly through the apertures in the perforate shield at a lower edge portion of the latter thereby virtually eliminating the otherwise natural tendency for colder (less hot) air to accumulate near the bottom of the chamber and, thus, normally create a temperature gradient of a lower temperature at the bottom of the mold as compared to a higher temperature in an upper portion of the mold or chamber. Thus, the combination of the circulating convection currents and the direct radiant heat through the apertured lower portion of the perforate screen ensures that a virtually constant and uniform temperature is created and retained throughout the interior of the chamber during a particular curing or precuring cycle.

In further accordance with this invention, the shields are designed to be located at selected positions axially relative to each other such that depending upon the precuring conditions desired, more or less (or none at all) of the lowermost perforated portion of the porous shield can be blocked or unblocked by the imperforate shield simply by moving these shields axially relative to each other. For example, if the imperforate shield is positioned with its lowermost edge exactly in line with the lowermost edge of the porous shield, no radiant heat would flow through the perforations of the porous shield directly toward a tire within the chamber, whereas if the imperforate shield were raised progressively more radiant heat would flow from the radiant heaters directly through the pores at the lower portion of the perforate shield and against or toward a tire immediately adjacent thereto, thus regulating not only the flow of the convection currents established by these shields but also the amount of direct radiant energy which passes from the radiant heaters through the perforate shield toward a tire directly adjacent thereto.

Another aspect of the present invention is to assure that the tires can be rapidly inserted into and removed from the chamber, and this is accomplished by a mechanism for accurately opening and closing an upper, normally opened end of the chamber by an associated cover through the utilization of a fluid cylinder which pivots an arm about a generally horizontal axis with an end portion of the arm overlying the cover of the chamber being utilized as a carrier for pulleys about which are entrained flexible cables operating through another fluid motor for moving the cover between opened and closed positions along a path coincident to the axes of the cover and the chamber, thus precluding cover-chamber open end binding and like malfunctions common in conventional mold or chamber closing mechanisms.

Yet another object of this invention is to provide a novel mechanism for opening and closing a chamber of the type last described wherein means are also provided for linearly guiding the cover relative to the overlying end portion of the pivotal arm, as well as locking the cover when retracted by the flexible cables for subsequent movement to an out-of-the-way position.

With the above and other objects in view that will hereinafter appear, the nature of the invention will be more clearly understood by reference to the following detailed description, the appended claims and the several views illustrated in the accompanying drawings.

IN THE DRAWINGS

FIG. 2 is a top plan view of the tire retreading machine of FIG. 1, and illustrates the cover overlying the chamber, a pair of arms carrying pulleys over which a pair of flexible cables are entrained, and a fluid motor for operating the cables to move the cover perfectly vertically along coincident axes of the cover and the chamber axis.

FIG. 3 is a fragmentary perspective view of a portion of one of the arms of FIG. 2, and illustrates the manner in which one of the flexible cables is entrained about one of the pulleys and a vertical guide rod received between guide rollers of the arm and a safety latching hook carried by the arm.

FIG. 4 is an enlarged fragmentary sectional view showing an end attaching device for securing one end of each of a pair of cables to the cover.

FIG. 5 is a highly schematic view, and illustrates the pair of cables, associated pulleys, and a fluid motor for raising and lowering the cover.

Figure 1:
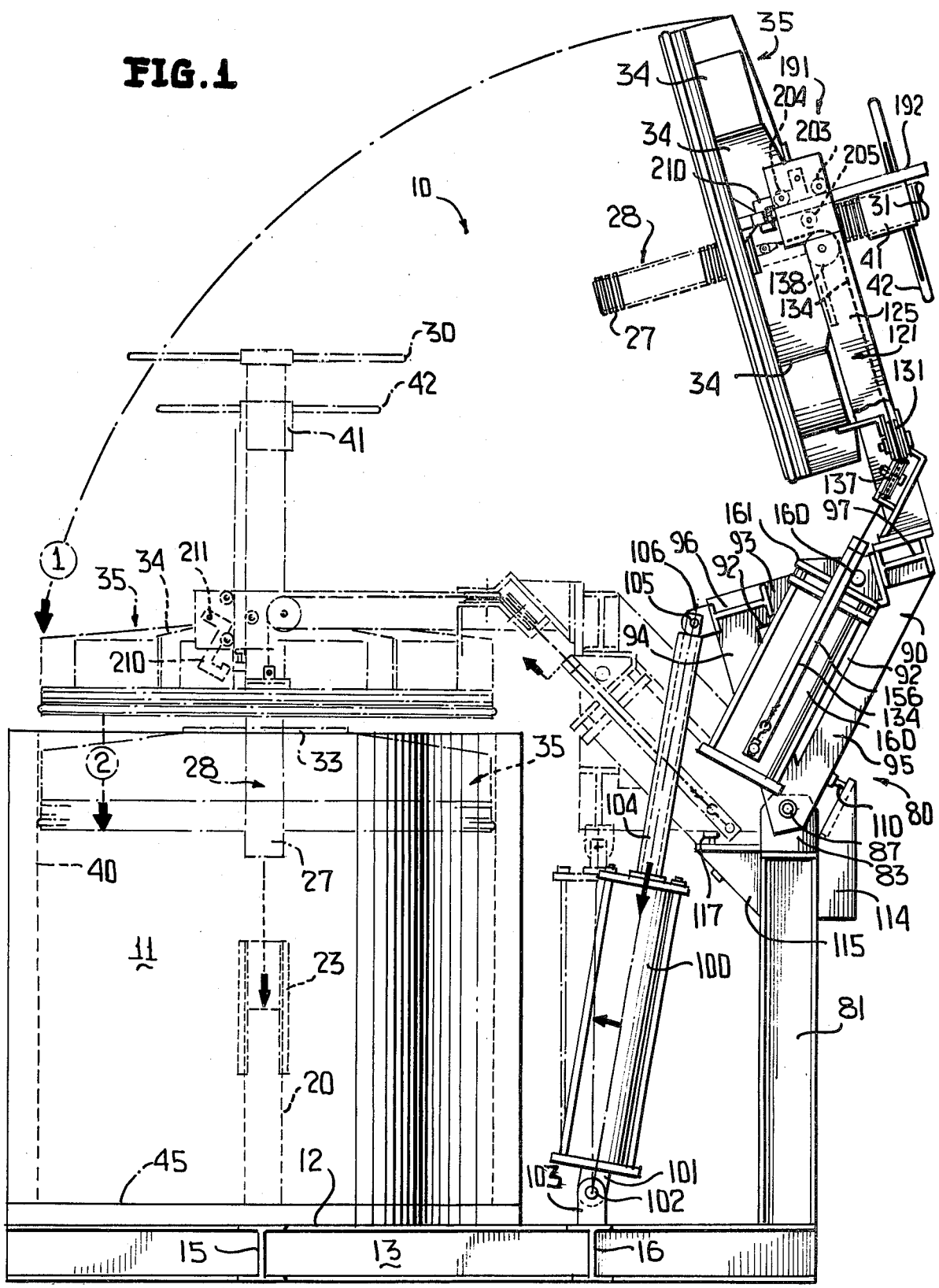
FIG. 1 is a side elevational view of the tire retreading machine of this invention with some parts broken away and others removed for clarity, and illustrates in solid lines a cover in its out-of-the-way position and in phantom outline both above and within an opened end of an associated precured chamber, mold or module.

A novel retreading machine constructed in accordance with this invention is generally designated by the reference numeral 10 and includes means defining a generally cylindrical upright curing or precured chamber 11 which has a bottom wall 12 resting upon and secured to a pair of generally parallel I-beams 13, 14 (FIG. 6) to which are welded or otherwise secured reinforcing I-beams 15, 16, (FIG. 1). A collar 17 is welded beneath the bottom wall 12 to the beam 15 and threadedly receives a lower threaded end portion 18 of a locking shaft 20 which projects upwardly through a central opening 21 of the bottom wall 12. A pin 22 passes through the collar 17 and the lower threaded end portion 18 of the locking shaft 20 to prevent rotation of the locking shaft 20 relative to the collar 17. A locking hub 23 is threaded upon an upper threaded end portion 24 of the locking shaft 20 and is locked in position by a transverse pin 25 passing through the upper threaded end portion 24 of the locking shaft 20 and the locking hub 23. The interior of the locking hub 23 includes threads 26 which receive a threaded end portion 27 of an upper full-length threaded locking screw 28 having a locking handle 30 at an uppermost end portion 31 of the locking screw 28. The threaded locking screw 28 passes freely through a bore 32 of a bushing or collar 33 welded to a plurality of radially disposed plates 34 in part defining a cover 35 of a generally annular configuration having an innermost circular opening 36 and an outermost circular peripheral edge 37 which carries a sealing gasket or O-ring 38 which in the closed position of the cover 35 engages in hermetic sealing relationship against an inner cylindrical surface 40 of the chamber 11. A nut 41 carries a handle 42 which is threaded upon the upper threaded end portion 31 of the locking screw 28, such that as the handle 42 is rotated clockwise, as viewed in FIG. 2, it will move the cover 35 downwardly which will assure that a plurality of annular hermetic seals S1 through S6 are created and maintained between imperforate flexible envelopes E1 through E4 encasing respective tires T1 through T4 during a precuring operation during which time precured tread t1 through t4 previously bonded to the tires T1 through T4 is subject to heat within the chamber 11 to cure the adhesive, thus bonding the tread T1 through T4 to the tires or tire carcasses T1 through T4, respectively. The tires T1 through T4 are, of course, held with their beads B1 through B4, respectively, in precure rims R1 through R4 in a conventional manner.

The seal S1 is shown being effected between the envelope E1 encasing the tire T1 and the tread t1 thereupon and an undersurface (unnumbered) of the cover 35.

The seal S2 is shown between an annular sealing plate 43 and the envelope E1, whereas the seal S3 is created between the sealing plate 43 and the envelope E2.

The seals S4 and S5 are formed between the abutting surfaces of the envelopes E2, E3, and E3, E4, respectively.

Finally, the seal S6 is formed between the envelope E4 and an annular sealing plate 44 resting upon a bottom surface 45 of the bottom wall 12 of the overall chamber 11.

Inboard of the inner chamber surface 40 are means generally designated by the reference numeral 50 for heating air within the chamber 11 with the means 50 being conventional radiant heaters, such as a plurality of individual generally circular Cal-Rods 51 through 59 which preferably are individually connected through individual thermostats (not shown) to an electrical heat source, although in lieu of the individually generally circular Cal-Rods 51 through 49, a singular generally serpentine Cal rod or radiation coil can be utilized having but two ends for connection to a single thermostat and an associated source of electrical power. In either event, the purpose of the heating means 50 is simply to raise the temperature within the chamber 11 sufficiently to cure the adhesive to bond the precured treads t1 through t4 to the respective tires T1 through T4.

Figure 6:
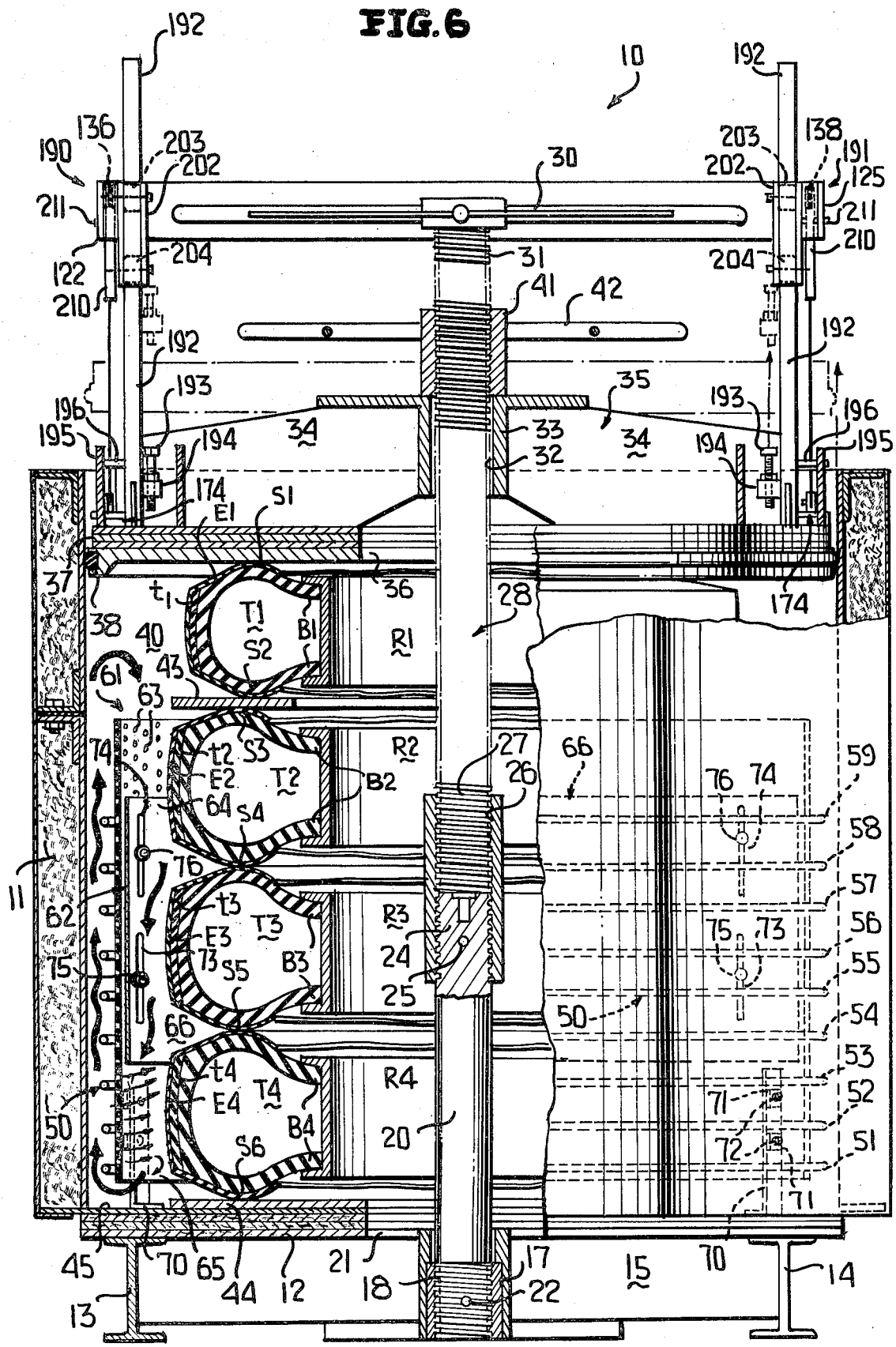
FIG. 6 is a side elevational view partially broken away for clarity with parts shown in section of the chamber and cover of this invention, and illustrates a radiant heater surrounding a porous shield which in turn surrounds an imperforate shield with the two shields collectively establishing hot air convection currents which flow in the manner indicated by the larger headed arrows in this figure.

Means generally designated by the reference numerals 61 and 62 are provided inboard of and in telescopic relationship to the radiant heating means 50 for establishing generally continuously circulating hot air convection currents within the chamber flowing generally upwardly adjacent the chamber inner surface 48 and flowing generally downwardly in the area adjacent the envelopes E1 through E4 in the manner indicated by the relatively large headed arrows to the left in FIG. 6. This flow of hot air by convection occurs, of course, about the entire inner periphery of the chamber 11 over uppermost top edge portions 63, 64 and beneath lowermost bottom edge portions 65, 66 of the respective means or shields 61, 62 with, of course, the bottom end portion 65 and 66 both being spaced from the bottom surface 45 of the chamber bottom wall 12. The means 61, 62 are respectively porous or perforated metal annular members or shields and nonporous or imperforate annular members or shields which totally surround the tires T1 through T4 in the manner clearly evident from FIG. 6 of the drawings. Furthermore, the shields 61, 62 can be moved axially relative to each other and to the inner surface 40 and the heating means 50 so that the distance of the lower edge portions 65, 66 of the respective shields 61, 62 from the bottom surface 45 of the bottom wall 12 of the chamber 11 can be varied, as can also be the amount of perforations in the bottom edge portion 65 exposed below the bottom edge portion 66 of the shield 62. As is readily apparent from the left-hand bottom corner of FIG. 6, the radiant heat of the three lowest Cal-Rods 51 through 53 can pass through the perforations of the perforate member 61 below the edge portion 66 of the imperforate shield 62, whereas direct radiant heat from the remaining Cal-Rods 54 through 55 is blocked by the shield 62. In this manner any tendency for less hot air to accumulate adjacent the bottom surface 45 of the chamber bottom wall 12 is precluded and, thus, any tendency for the temperature in the area of the tire T4 to be less than the temperature thereabove is reduced because of the direct radiant heating effected by the flow of direct radiant heat through the apertures of the exposed lower end portion 65 of the perforate shield 61, as is indicated by the small headed unnumbered arrows associated therewith. In this manner, the means 61, 62 assure uniform heat throughout the mold or chamber interior and, uniform curing of the adhesive and, thus, adequate bonding of the new precured tread t1 through t4 to the respective tire carcasses T1 through T4.

The perforate shield 61 is supported with its lower end portion 65 in spaced relationship to the bottom surface 45 of the chamber bottom wall 12 by a plurality of generally L-shaped legs 70 having apertures 71 through which are passed bolts and associated nuts 72 being secured thereto after passing through the perforations (unnumbered) of the shield 61. Obviously, the fastening means can be utilized in a variety of different ones of the perforations in the shield 61 to vary the distance of the lower edge portion 65 thereof from the surface 45. Likewise, to axially adjust the annular imperforate shield 62 relative to the perforate shield 61, the imperforate shield 62 has a plurality of elongated slots 73, 74 receiving respective fastening means 75, 76 in the form of bolts and nuts with the bolts passing through the perforations of the shield 61 thus permitting the shield 62 to be moved vertically upwardly or downwardly to vary the size of the exposure of the perforated bottom edge portion 65 of the shield 61 below the lower imperforate edge portion 66 of the shield 62.

Reference is now made to means generally designated by the reference numeral 80 for effecting overall movement of the cover 35 from a position within an upper end portion (unnumbered) of the chamber 11 (FIG. 6) at which time the mold is closed with the O-ring seal 38 in hermetic sealing engagement with the surface 40 and two other positions, the first of which is shown in FIG. 1 in phantom outline with the cover 35 being spaced above its closed position relative to the chamber 11 after axial vertical movement, and a second out-of-the-way position shown in solid outline in FIG. 1.

The mechanism 80 is carried by a pair of vertical I-beams or uprights 81 (FIG. 1), 82 having respective upstanding plates 83, 84 and 85, 86 through which pass respective pivot pins 87, 88. The pins 87, 88 pivotally secure respective generally triangular shaped plates or arms 90, 91 between the respective plates 83, 84 and 85, 86. The plates or arms 90, 91 are both of an identical construction, and as is best illustrated in FIG. 1, the plate or arm 90 includes a generally triangular opening 92 which lessens the overall weight or mass of the arm 90 and in effect sets off two portions 93, 94 which are disposed generally normal to each other and another portion 95 which defines a portion lying on a hypotenuse between the two portions 93, 94. A pair of I-beams 96, 97 (FIG. 1) are welded to the portion 93 of the arm 90 and also to the same portion (now shown) of the arm 91, as is readily apparent from FIG. 2 of the drawings.

The arms 90, 91 are pivoted between the solid and phantom outline positions (FIG. 1) by means in the form of a hydraulic cylinder 100 having an arm 101 secured by a pivot pin 102 to a bracket 103 which is in turn welded to the I-beam 16 at a point midway between the beams 81, 82. The cylinder 100 receives therein a double acting piston rod 104 which is reciprocated in a conventional manner as oil or other fluid is introduced into and removed from rod and head ends of the piston (not shown) associated with the rod 104 in a conventional manner. The piston rod 104 is connected by a pivot pin 105 to a bracket 106 which is in turn welded to the underside of the I-beam 96 (FIG. 1) approximately midway between the plates or arms 90, 91. As the piston rod 104 is extended from its retracted phantom outline position (FIG. 1) to its solid position in this same figure, the arms 90, 91 are moved or pivoted clockwise in FIG. 1 to swing the cover 35 to the out-of-the-way position shown in solid outline in FIG. 1 and, of course, reverse movement of the rod 104 into the cylinder 101 results in the movement of the arms or plates 90, 91 form the solid to the phantom outline positions and the movement of the cover 35 to the uppermost phantom outline position shown in FIG. 1.

The movement of the arms or plates 90, 91 between the two positions just described is limited by a pair of adjusting screws or bolts 110, 111 and 112, 113 carried by respective plates 114, 115 and 116, 117 with the plates 114, 116 being bridged by a horizontal plate 118. In the out-of-the-way position shown in FIG. 1, the hypotenuse portion 95 of the arm 90 contacts the adjustable stop means or limiting means 110, and the same hypotenuse portion (not shown) of the arm 91 likewise contacts the limiting means 112. In the other position, the bottom edge (unnumbered) of the portion 94 of the arm or plate 90 contacts the limiting means 111, and the same unnumbered portion of the arm 91 contacts the stop means or limiting means 113, as is most readily apparent from FIG. 2.

Each of the arms or plates 90, 91 carry arms or extensions 120, 121 which are disposed in a generally horizontally plane when the axis of the cover is normal to the horizontal, as is illustrated in both phantom outline illustrations of the cover 35 in FIG. 1. Each of the arms or arm extensions are defined by respective spaced plates 122, 123 and 124, 125. A plate 126 is welded to the upper edges of the arms or plates 122, 123 and has pivotally secured thereto by a pivot pin 127 a pulley 128. Another plate 130 is welded atop the edges of the plates 124, 125 and carries a pulley 131 by means of a pivot pin 132. Means in the form of two flexible members or cables 133, 134 are entrained about the respective pulleys 128, 131 and are also entrained about two additional pulleys 135, 136 and 137, 138. The pulleys 135, 137 are connected by pivot pins 140, 141 to respective plates 142, 143 which are welded or otherwise secured to the beam 97. The pulleys 136, 138 are sandwiched between the respective plates 122, 123 and 124, 125 and are secured thereto for rotation about respective pins 145, 146. An end 147, 148 (FIG. 2) of the respective cables 133, 134 is looped and attached thereby to an I-bolt 150, 151 having a threaded end portion (unnumbered) received in respective threaded bores (unnumbered) of studs 152, 153 carried by a generally U-shaped or C-shaped frame 154 having a pair of legs 155, 156 and a bight portion 157 to which is secured a rod 158 of a fluid cylinder 160. The fluid cylinder 160 is in turn welded to a plate 161 having an aperture 162 through which the rod 158 passes. The plate 161 is welded at ends thereof to side plates 163, 164 which carry respective guide rollers 165, 166 bearing against upper surfaces of the respective legs or arms 155, 156. Ends 168 of each of the cables 133, 134 are also looped (FIG. 4) and receive pins 170 keyed in an aperture (unnumbered) of a bifurcated cylindrical rod 171 which projects vertically upwardly (FIGS. 3 and 4) from a cylindrical plate 172 resting atop an upper plate 173 of the cover 35. The plate 172 is received within an enlarged cylindrical housing 174 defined by an end wall 175 having an enlarged circular opening 176 and a peripheral wall 177. Bolts 178 secure the walls 175, 177 to the plate 173 of the cover 135 whereas threaded bolts 180 threaded within the wall 175 and bearing against the plate 176 can be utilized to adjust the position of the rod 171 to assure axially alignment between the center axis of the cover 35 and the center axis of the chamber 11.

As is most readily apparent from FIGS. 2 and 5, if the cover 35 is within the upper end portion (unnumbered) of the chamber 11 and it is desired to move the same upwardly therefrom, hydraulic fluid from a suitable source is introduced into the cylinder 160 to retract the rod 158 therein thereby drawing the bight portion 157 and the arms 155, 156 carry thereby downwardly, as viewed in FIG. 5, toward the cylinder 160. This in effect pulls the ends 147, 148 of the respective cables 133, 134 downwardly and to the right causing rotation of the respective pulleys 128, 135, 136 and 137, 131 and 138 resulting in the lifting of the cover 35 along generally a perfectly vertical axis or plane, as is most evident again in FIGS. 1 and 5. Obviously, reverse operation results in the rod 158 being extended from the cylinder 160 and the lowering of the cover 35 from the uppermost phantom outline position shown in FIG. 1 to the lowermost position in this same figure.

During the movement of the cover 35 under the influence of the flexible cables 133, 134, guidance for the movement of the cover 35 is effected by a pair of vertical guide means associated with each of the arms 120, 121 with the guide means being generally designated by the reference numerals 190 and 191 (FIG. 2). Since the guide means are identical, the guide means 190 associated with the arm 120 which is best illustrated in FIG. 3 will be described and the description thereof is equally applicable to the guide means 191.

The guide means 190 includes a rectangular vertical arm 192 having a bottom end portion (unnumbered) welded to the upper plate 173 of the cover 35. A headed threaded bolt 193 is threadedly received in a threaded bore (unnumbered) of a projection 194 carried by a lower end portion of the rod 192. A vertical plate 195 is also welded to the plate 173 of the cover 35 and another cylindrical rod 196 is welded to an upper end of the plate 195 and the rod 192.

A pair of plates 200, 201 are welded to the plate 123 of the arm 20 and these plates 200, 201 are spanned by another plate 202. The plates 200 through 202 thereby define a housing within which are mounted three rollers 203 to 205 which are appropriately journaled for rotation about pins (not shown) fixed to the arm 120. The rod 192 is in intimate sliding relationship to the rollers 203 through 205 and, thus, is guided in its vertical movement, upwardly or downwardly, thereby effecting like guidance for the cover 35 associated therewith. When the cover 35 reaches the uppermost vertical position which is the second or uppermost phantom outline position shown in FIG. 1, a hook 210 pivoted by a pivot pin 211 to the arm 123, and another identical unillustrated hook similarly connected to the arm 121, is utilized to engage the rod 196 to assure that the cover 195 can not accidentally drop from its most adjacent position relative to the arms 120, 122 in the event, for example, one or both of the flexible cables 133, 134 might break or hydraulic pressure is lost in the cylinder 160, or both. After the cover 35 has been locked by both hooks 210 in the uppermost phantom outline position shown in FIG. 1, the mechanism 100, 104 can be operated to pivot the cover 35 from the second uppermost phantom outline position in FIG. 1 to the out-of-the-way position shown in solid outline in this same figure.

Although a preferred embodiment of the invention has been specifically illustrated and described herein, it is to be understood that minor variations may be made in the apparatus without departing from the spirit and scope of the invention, as defined in the appended claims.

I claim:

1. A tire retreading machine including means for defining a chamber adapted to receive therein a tire to be retreaded, said chamber including an inner surface from which a tire periphery is spaced when being disposed in the chamber during a retreading operation, means for heating the interior of said chamber, and means for establishing generally continuously circulating hot air convection currents within said chamber flowing generally upwardly adjacent said chamber inner surface and flowing generally downwardly more remotely inward from said chamber inner surface than the upwardly flowing currents.

2. The tire retreading machine as defined in claim 1 wherein said heating means includes a radiant heater.

3. The tire retreading machine as defined in claim 1 wherein said convection current establishing means is a shield positioned in generally telescopic relationship to said heating means.

4. The tire retreading machine as defined in claim 1 wherein said convection current establishing means is a shield positioned in generally internal telescopic relationship to said heating means.

5. The tire retreading machine as defined in claim 1 wherein said convection current establishing means is a porous shield positioned in generally telescopic relationship to said heating means.

6. The tire retreading machine as defined in claim 1 wherein said convection current establishing means is an imperforate shield positioned in generally telescopic relationship to said heating means.

7. The tire retreading machine as defined in claim 1 wherein said convection current establishing means is a porous shield positioned in generally internal telescopic relationship to said heating means.

8. The tire retreading machine as defined in claim 1 wherein said convection current establishing means is an imperforable shield positioned in generally internal telescopic relationship to said heating means.

9. The tire retreading machine as defined in claim 1 wherein said chamber includes a bottom surface, and said convection current establishing means is a shield positioned in generally telescopic relationship to said heating means and in spaced relationship to said bottom surface.

10. The tire retreading machine as defined in claim 1 wherein said convection current establishing means are a pair of shields, one being porous and the other being imperforate, and said pair of shields and convection current establishing means are in relative telescopic relationship to each other.

11. The tire retreading machine as defined in claim 1 wherein said convection current establishing means are a pair of shields, one being porous and the other being imperforate, said pair of shields and convection current establishing means are in relative telescopic relationship to each other, and said chamber includes a bottom surface, and both of said shields are spaced from said bottom surface.

12. The tire retreading machine as defined in claim 1 wherein said convection current establishing means are a pair of shields, one being porous and the other being imperforate, said pair of shields and convection current establishing means are in relative telescopic relationship to each other, and said porous shield is positioned between said heating means and said imperforate shield.

13. The tire retreading machine as defined in claim 1 wherein said convection current establishing means are a pair of shields, one being porous and the other being imperforate, said pair of shields and convection current establishing means are in relative telescopic relationship to each other, said chamber includes a bottom surface, both of said shields are spaced from said bottom surface, and said porous shield is positioned between said heating means and said imperforate shield.

14. The tire retreading machine as defined in claim 1 wherein said convection current establishing means are a pair of shields, one being porous and the other being imperforate, said pair of shields and convection current establishing means are in relative telescopic relationship to each other, said porous shield projects below a lowermost edge of said imperforate shield, and said heating means is disposed outboard of said porous shield whereby hot currents emitted by said heating means pass through said porous shield and beneath said lowermost edge.

15. The tire retreading machine as defined in claim 1 wherein said convection current establishing means are a pair of shields, one being porous and the other being imperforate, said pair of shields and convection current establishing means are in relative telescopic relationship to each other, said porous shield projects above a uppermost edge of said imperforate shield, and said heating means is disposed outboard of said porous shield whereby hot currents emitted by said heating means pass through said porous shield and above said uppermost edge.

16. The tire retreading machine as defined in claim 14 wherein said heating means is disposed outboard of both said shields.

17. The tire retreading machine as defined in claim 14 including means for supporting a plurality of tires in stacked relationship in said chamber, said chamber further including a removable cover and a bottom chamber surface, and envelopes encasing tires within the chamber and defining a plurality of inboard seals hermetically sealing said chamber and imparting thereto a generally annular internal configuration.

18. The tire retreading machine as defined in claim 17 including means for moving said cover along an axis coincident to a central axis of said chamber to introduce said cover into and withdraw said cover from said chamber, and means for moving said cover along an arcuate path of travel during opening movement only after the cover has been first moved along said coincident axis.

19. The tire retreading machine as defined in claim 18 including fluid motor means for moving said cover along at least said coincident axis.

20. Apparatus for opening and closing a chamber comprising means defining a chamber having an open upper end, a cover for closing said end, said cover having a central axis in coincident relationship to a central axis of said chamber when said cover closes said chamber upper end, first means for moving said cover between closed and open positions relative to said chamber upper end along a path of travel coincident to said axes, and second means for moving said cover from its open position relative to said chamber upper end along an arcuate path of travel to an out-of-the-way position to effect unobstructed access to said chamber through said chamber upper end.

21. The apparatus as defined in claim 20 wherein said first moving means is at least in part defined by a flexible member.

22. The apparatus as defined in claim 20 wherein said first moving means is at least in part defined by a flexible member having a portion thereof in parallel relationship to said axes.

23. The apparatus as defined in claim 20 wherein said first moving means is at least in part defined by a flexible member having a portion thereof in parallel relationship to said axes, and fluid motor means connected to said flexible member for moving the same to move said cover from its closed to its open position.

24. The apparatus as defined in claim 20 wherein said second moving means includes an arm having a portion overlying said chamber upper end in the closed position of said cover, and means between said cover and said arm portion for guiding the movement of said cover between the open and closed positions thereof and vice versa.

* * * * *